(12) United States Patent
Cragun

(10) Patent No.: US 6,177,873 B1
(45) Date of Patent: Jan. 23, 2001

(54) WEATHER WARNING APPARATUS AND METHOD

(75) Inventor: Brian J. Cragun, Rochester, MN (US)

(73) Assignee: International Business Machines Corporation, Armonk, NY (US)

(*) Notice: Under 35 U.S.C. 154(b), the term of this patent shall be extended for 0 days.

(21) Appl. No.: 09/245,652

(22) Filed: Feb. 8, 1999

(51) Int. Cl.[7] .................................................. G01W 1/00
(52) U.S. Cl. ................... 340/601; 702/3; 342/26
(58) Field of Search ................ 340/601; 702/2, 702/3; 73/170.16; 342/26

(56) References Cited

U.S. PATENT DOCUMENTS

| | | | |
|---|---|---|---|
| 4,218,755 | * 8/1980 | Root | 702/3 |
| 5,121,430 | * 6/1992 | Ganzer et al. | 380/48 |
| 5,517,193 | * 5/1996 | Allison et al. | 342/26 |
| 5,568,385 | 10/1996 | Shelton . | |
| 5,717,589 | 2/1998 | Thompson et al. . | |
| 5,867,805 | * 2/1999 | Brown | 702/3 |
| 5,949,851 | * 9/1999 | Mahaffey | 340/601 |

OTHER PUBLICATIONS

DTN Weather Center Brochure, Data Transmission Network Corporation, 6 pages (no date).
NOAAPORT Broadcast System Document, Doc. ID No. AWP.DSN.NPBRD–04.00 (Oct. 1, 1997).
NOAA Weather Radio Brochure (Mar., 1997).
"NOAAPORT User's Page," Document URL: http://www.nws.noaa.gov/noaaport/html/sat loc.shtml, (last modified: Nov. 10, 1998).
"Radar Products & Publications," Document URL: http://www.ncdc.noaa.gov/ol/radar/radarproducts.html, (last modified: Nov. 17, 1997).
"UNISYS Weather Information," Document URL: http://www.ncdc.noaa.gov/ol/radar/radarproductssoftwareunisys.html, (last modified: Sep. 14, 1997).
"About NCDC's Satellite Resources," Document URL: http://www.ncdc.noaa.gov/ol/satellite/satelliteresourcesabout.html, (last modified: Oct. 21, 1998).
"Direct Satellite Readout Systems," Document URL: http://sdcd.gsfc.nasa.gov/ISTO/dro/dro intro.html, (printed Nov. 10, 1998).
Internet Weather Links, 1 page (no date).
"A Change in the Weather Service" Brochure by U.S. Department of Commerce, National Oceanic and Atmospheric Administration, Nov., 1993.
Radio Shack 7 Channel Weatheradio On–line Owner's Manual, Document URL: http://support.tandy.com/support audio/doc40/40817.htm (printed Feb. 1, 1999).
Internetsite:Weather Alertradios.com, 1999.*

* cited by examiner

Primary Examiner—Jeffery A. Hofsass
Assistant Examiner—John Tweel, Jr.
(74) Attorney, Agent, or Firm—Martin & Associates, L.L.C.; Derek P. Martin

(57) ABSTRACT

A weather warning apparatus and associated method notifies a user when weather alerts are issued according to geographical areas of interest and weather notification parameters that are set by the user. The weather warning apparatus includes a communication link for receiving transmitted alerts, such as weather warnings, watches and statements, civil emergencies, and the like. The weather warning apparatus also includes a user interface for selecting geographic areas of interest and weather notification parameters, such as weather events that may be of interest to a user at a desired time of day or time interval. The user's selection of geographic area and weather notification parameters allows the weather warning apparatus to filter out unwanted weather alerts that are outside of the desired geographic area, type of weather event notification, time or time interval. In addition, the user can independently select whether the events of interest in the geographic region of interest at the appropriate times create an audible warning, a visual warning, or both.

20 Claims, 5 Drawing Sheets

WEATHER WARNING APPARATUS AND METHOD

BACKGROUND OF THE INVENTION

1. Technical Field

This invention relates to weather warning systems and, more particularly, to a weather radio apparatus and method for providing notification of weather-related events according to geographical and weather warning parameters that are defined by a user.

2. Background Art

Interest in weather-related events has dramatically increased during recent years with the advent of high-quality satellite and radar imaging systems, and their increased ability to accurately forecast future weather events. Currently, weather messages are continuously broadcast through a special weather radio signal on the VHF band, ranging between 162.400 and 162.550 MHZ, which is outside the normal AM and FM broadcast bands. This special radio signal is provided by the National Oceanic and Atmospheric Administration (NOAA). Special weather radios must be used in order to receive these types of weather broadcasts. Weather messages are repeated every 4 to 6 minutes and are routinely updated every one to six hours, or more often when rapidly changing weather conditions are present. The weather broadcasts may also include severe weather warnings that pose a threat to life and safety. When emergency situations occur, a special signal is broadcast from a regional office. Weather radios detect this signal and typically respond by sounding an alarm indicating that a weather alert has been issued. The user can then turn on the radio and listen to the voice broadcast of the warning. In one advanced alerting system known as "Specific Area Message Encoding" (SAME) made available by NOAA, digital coding is used to activate special receivers that have been programmed to broadcast emergency conditions in a particular geographic area, typically a county. In specially equipped radios and cable television receivers that can read the digital encoded signal, a short text message that identifies location and type of emergency can be displayed.

One weather radio that takes advantage of the SAME alerting system is known as the "RadioShack 7-Channel Weatheradio with NWR-SAME Severe-Weather Alert." This radio receives and processes the digital coding provided by NOAA for preselected counties by inputting county codes through a keypad. This radio may be set to sound an alarm when the National Weather Bureau issues a weather warning, watch, or statement for the selected county codes. The radio may also be set so it does not sound an alarm. A visual indication of the type of weather alert being broadcast is also provided. Although this radio is programmed to sound audibly distinct tones for weather warnings and statements, persons may be awakened many times from sleep during the night for special weather statements that are not life threatening. There is thus a tendency to turn off the alarm during normal sleeping hours and risk the danger of missing more severe weather conditions, such as tornado watches and warnings, especially if an alert has already woken the user due to less severe conditions.

Another type of weather warning system is provided by Data Transmission Network Corporation (DTN) of Omaha, Nebr. In this system, emergency weather information is sent directly to an alpha-numeric pager. Information such as weather watches, warnings and storm movement, local weather updates twice daily for an eight-county area, severe weather watches and warnings, dense fog advisories, winter storm watches and warnings, highway watches and warnings, freezing precipitation advisories, and avalanche bulletins are available in alpha-numeric format. In addition, an audible alarm may also be provided on the pager to signal certain weather events.

Although these systems provide severe weather warnings and local weather updates at recurring intervals, they respond to all issued weather alerts, including alerts that are not life threatening. The effect is not only disrupting, but may also reduce the effectiveness of the system because alerts can become too commonplace and therefore may go unheeded.

DISCLOSURE OF INVENTION

According to the present invention, a weather warning apparatus and associated method notifies a user when weather alerts are issued according to geographical areas of interest and weather notification parameters that are set by the user. The weather warning apparatus includes a communication link for receiving transmitted weather alerts, such as weather warnings, watches and statements, civil emergencies, and the like. The weather warning apparatus also includes a user interface for selecting geographic areas of interest and weather notification parameters, such as weather events that may be of interest to a user at a desired time of day or time interval. The user's selection of geographic area and weather notification parameters allows the weather warning apparatus to filter out unwanted weather alerts that are outside of the desired geographic area, type of weather event notification, time or time interval. In addition, the user can independently select whether the events of interest in the geographic region of interest at the appropriate times create an audible warning, a visual warning, or both.

There are, of course, additional features of the invention that will be described hereinafter which will form the subject matter of the appended claims. Those skilled in the art will appreciate that the preferred embodiments may readily be used as a basis for designing other structures, methods and systems for carrying out the several purposes of the present invention. It is important, therefore, that the claims be regarded as including such equivalent constructions since they do not depart from the spirit and scope of the present invention. The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Figure 1:
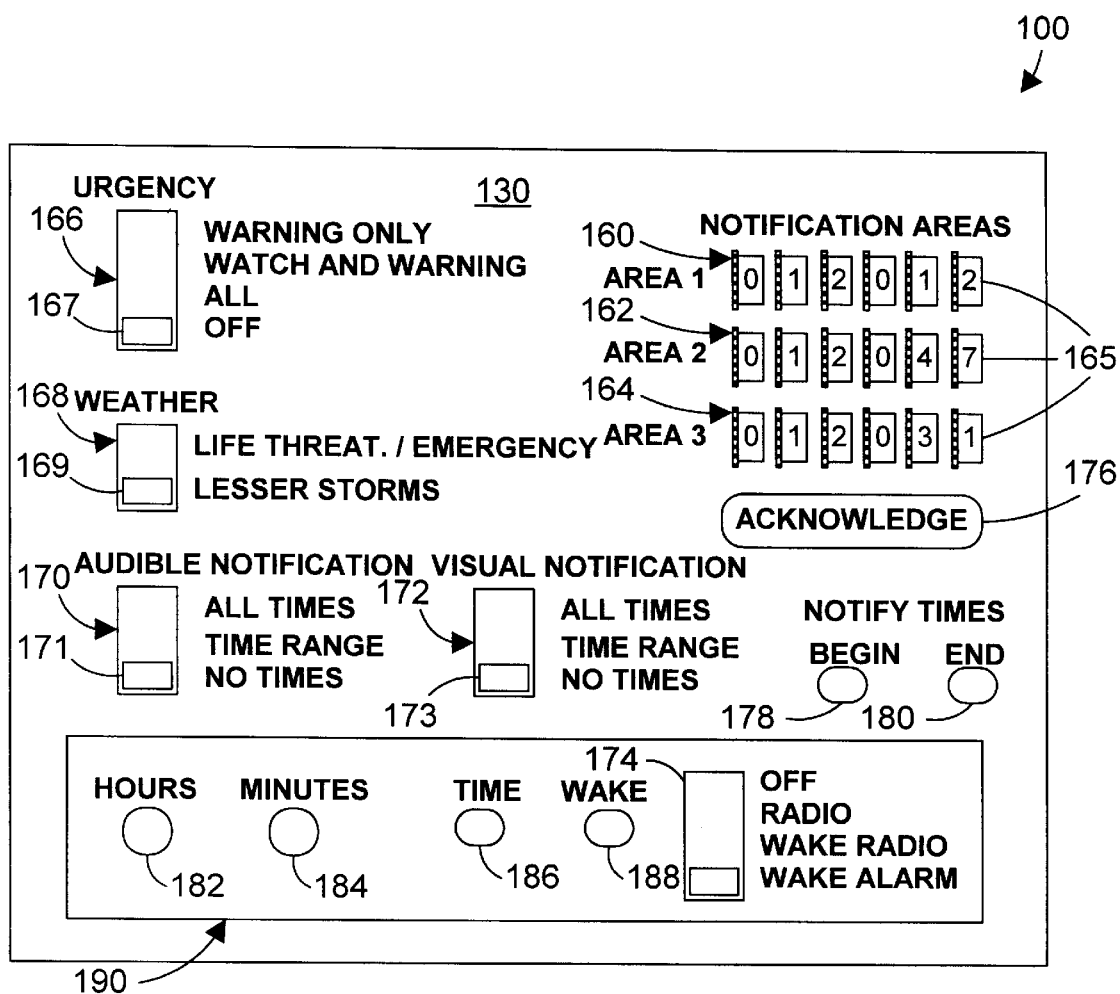
FIG. 1 is a top plan view of a weather warning apparatus according to a preferred embodiment of the invention.
Figure 2:
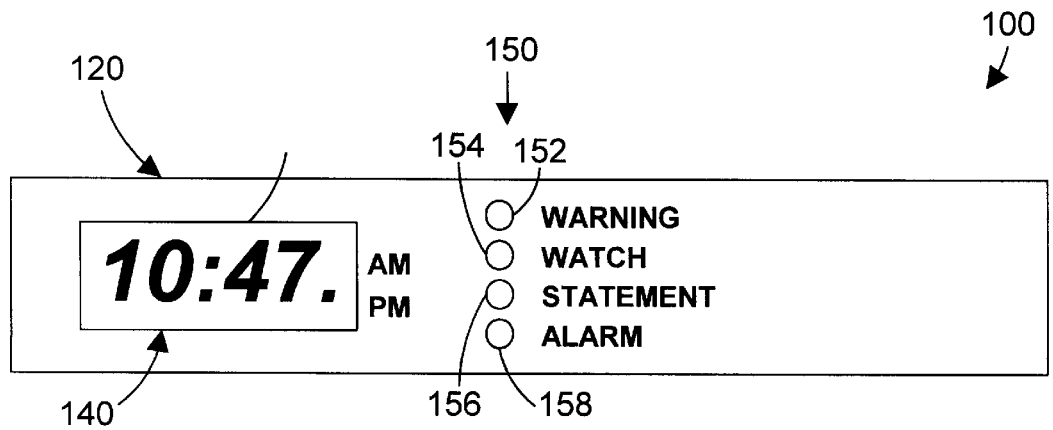
FIG. 2 is a front elevational view of the weather warning apparatus of FIG. 1.

Referring now to the drawings, and to FIGS. 1 and 2 in particular, a weather warning apparatus 100 in the form of a multi-function radio includes a housing that accommodates a display panel 120 and a control panel 130. Display panel 120 is preferably located on the front of apparatus 100, while control panel 130 is preferably located on the top of apparatus 100. With additional reference to FIG. 3, the apparatus 100 includes a communication link 310, memory 320, an audio indicator 324, a visual indicator 326, and a clock 330, all of which are connected to a processor 340. Processor 340 receives user input 350. User input 350 includes a geographical selector mechanism 352 and a notification selector mechanism 354. The warning apparatus 100 is preferably connected to a household power source (not shown) or may include a power source, and/or backup power source, such as a battery, solar cell, or the like (not shown), for providing electrical power to the processor 340 and other electronic components in apparatus 100.

With particular reference to FIG. 2, a display panel 120 includes a first display section 140 and a second display section 150. Display panel 120 of FIG. 2 represents the preferred embodiment for visual indicator 326 of FIG. 3. The first display section 140 displays the time of day in a normal operating mode, and can be any suitable display that is capable of displaying the time in numeric format, such as seven-segment or alphanumeric light-emitting diode (LED) or liquid crystal display (LCD) modules, graphic modules, vacuum fluorescent display modules, etc. In a preferred embodiment, the first display section 140 is a seven-segmnent LED module. Depending on the type of display used, a suitable display driver (not shown) may be connected between the processor 340 and the visual indicator 326 for receiving display information from the processor and displaying this information on a visual indicator, such as display section 140.

The second display section 150 includes indicators 152, 154, 156, and 158 that illuminate when certain preset parameters on the control panel have been satisfied, as will be described in greater detail below. The indicators 152 to 158 are preferably of the LED type. However, any suitable means can be used for visually indicating when the preset parameters have been met, such as one or more light bars wherein individual LED's are linearly mounted in a common plastic substrate, incandescent lights, LCD panels and other well known displays, dial gauges, etc. Although the first and second display sections are shown as separate sections in FIG. 2, it is to be understood that they may be integrated into a single display.

Figure 3:
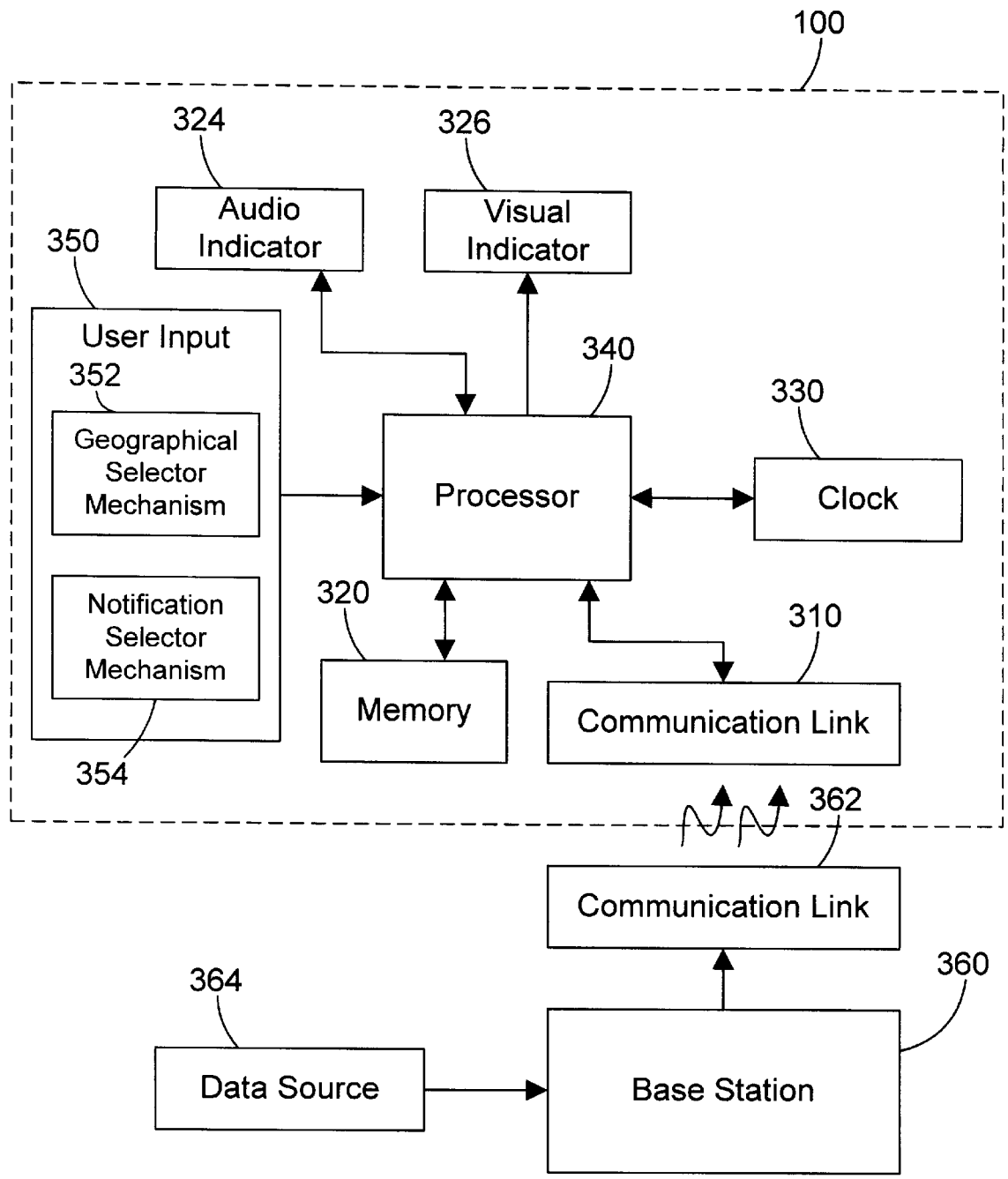
FIG. 3 is a block diagram schematic representation of a weather warning apparatus of the preferred embodiment.

With particular reference to FIG. 3, processor 340 is any suitable microprocessor, microcontroller, or other processor that is capable of receiving user input 350, receiving timing input from clock 330, receiving data over communication link 310, outputting display data to the visual indicator 326, and outputting audible sounds to an audio indicator 324. While the processor 340 is preferably a single-chip processor, processor 340 also encompasses any number of integrated circuits and circuit boards working in cooperation to perform the functions of a processor.

User input 350 represents any suitable means for a user to input information to apparatus 100. In the preferred embodiment, user input 350 is accomplished using thumbwheel switch sets 160, 162, 164; slide switches 166, 168, 170, 172, and 174; and push-button switches 176, 178, 180, 182, 184, 186, and 188 (see FIG. 1). Of course, many other types of user input means fall within the scope of the present invention, including without limitation rotary switches, keypads, voice recognition, etc. Any means for a user to provide input to apparatus 100 is within the scope of the present invention, it whether the means exists today or is developed in the future.

Communication link 310 comprises any suitable means for receiving information from a base station 360 and for routing information received from the base station 360 to the processor 340. Communication link 310 preferably includes a radio frequency tuner, and may include one or more antennae or other mechanical or electrical apparatus for communicating between base station 360 and apparatus 100. Alternatively, the communication link 310 may include a receiver that is tuned to a non-radio frequency in the electromagnetic spectrum for receiving signals from the base station 360 transmitting signals at or near the same frequency.

Base station 360 transmits weather alert signals, such as warnings, watches, statements, and other similar signals based on real-time or near real-time weather information, via communication link 362. The weather information comes from a data source 364 that provides weather data to the base station 360. Examples of weather data are discussed in more detail below.

Although a single base station 360 is depicted in FIG. 3, a plurality of base stations 360 are preferably provided at predefined localities across an area, such as a town, city, county or fraction thereof, state, country, continent, etc. The number of base stations could depend at least partially on the mode of transmitting the weather warning data from the base station 360 to the apparatus 100.

Data transfer between the communication links 362 and 310 is preferably accomplished in the VHF band, in the frequency range from about 162.400 to about 162.550 MHz. However, any means for transferring data between the base station 360 and warning apparatus 100 in the electromagnetic spectrum can be used within the scope of the present invention, including without limitation frequency modulation, amplitude modulation, modem, microwave circuitry, or other means for transmitting information from one location to another.

Weather data provided by data source 364 can include, but is not limited to, information from the NOAA weather wire, such as tornado and severe weather warnings, watches and statements, high wind watches and warnings, dense fog advisories, winter storm watches and warnings, freezing precipitation advisories, avalanche bulletins, hurricane warnings, watches and statements, blizzard warnings, flood warnings watches and statements, or any other weather-related data. In addition, non-weather-related alerts, such as nuclear attack warnings and civil emergencies, can also be provided by data source 364 to base station 360 for transmission to alert people of these types of emergencies as well.

Referring again to FIG. 1, the control panel 130 includes multi-position thumbwheel switch sets 160, 162 and 164 for indicating the area or areas of interest for receiving weather notifications. These areas of interest are also referred to herein as weather alert areas. Switch sets 160, 162 and 164 represent first, second and third areas, respectively. Each switch set includes six thumbwheel switches 165 that rotate to ten different positions to expose digits 0 through 9. A particular combination of digits represents an area that the user may wish to receive weather notifications. For example, switch set 160 shows digits "012012" representative of a first area, switch set 162 shows digits "012047" representative of a second area which is different from the first area, and switch set 164 shows digits "012031" representative of a third area which is different from the first and second areas. Each notification area preferably represents a county or a fraction thereof, but may represent other areas, depending on the location and weather history in that location. The National Weather Service has divided the United States by state and county (or parish) into six-digit Federal Information Processing System (FIPS) codes for the purpose of broadcasting weather conditions, and will eventually divide some large counties into subcounties. These codes can be entered by adjusting the thumbwheel switches 165 of the switch sets 160, 162 and 164. It is contemplated that one or more cities, towns, subdivisions, and the like, may also be assigned as a notification area. In an alternative arrangement, more or less digits (and thus thumbwheel switches) may be used depending on the number of areas to be defined. The switch sets 160, 162 and 164 are connected to the processor 340 for inputting the desired geographic areas of interest into the processor.

A look-up table (not shown) may be provided that lists regions, counties, cities, towns, and so on, each with its own unique number, arranged alphabetically and/or numerically for deciding which area(s) to program into the warning apparatus 100. If the user wishes to receive weather notices in only one or two areas, the thumbwheel switches in the remaining set(s) can be rotated so that digits "000000" (or any other predefined combination of digits) are exposed in order to turn off the remaining set(s).

Although three thumbwheel switch sets are shown, it is to be understood that more or less switch sets may be provided. Moreover, although thumbwheel switches 165 provide a quick and easy input means for programming one or more notification areas, the invention is not to be limited thereto. It is contemplated that other input means for setting one or more notification areas can be used, such as keypads, slide switches, rotary switches, toggle switches, DIP switches, potentiometers, variable capacitors, voice, and the like.

A user may set weather notification parameters that determine which alerts generate notifications to the user. Examples of weather notification parameters in the preferred embodiment are urgency switch 166 and weather switch 168. Urgency switch 166 is preferably a four-position slide switch that is connected to the processor 340 for programming the degree of weather urgency desired. As shown, a slide 167 of the switch 166 is located at the "OFF" position, which turns off the weather warning features of the apparatus 100. The slide 167 may also be located at any one of the urgency positions, such as "WARNING ONLY" wherein issued warnings within the geographical region of interest are provided on indicator 152 and/or via audible notification on the audio indicator 324; "WATCH AND WARNING" wherein issued watches and warnings within the geographical region of interest are provided on indicators 154 and 156 and/or via audible notification on the audio indicator 324; and "ALL" wherein issued warnings, watches, statements and the like within the geographical region of interest are provided on indicator 152 and/or via audible notification on the audio indicator 324. The choice of visually displaying and audibly sounding the degree of weather urgency depends on the position of switches 170 and 172, as will be described in greater detail below. Although the slide switch 166 is shown with four positions, it is to be understood that a switch with more or less positions may be provided, depending on the number and type of urgency categories that are currently available or that may be made available in the future.

Weather switch 168 is preferably a two-position slide switch that is connected to the processor 340 for programming the type of weather for which a user may wish to receive notification. As shown, a slide 169 of the switch 168 is located at the "LESSER STORMS" position, wherein both life threatening conditions and weather conditions of lesser consequence can be displayed on the second display section 150 and/or sent to audio indicator 324, depending on the position of area switches 165, urgency switch 166, audible notification switch 170, and visual notification switch 172. The slide 169 may also be located at the "LIFE THREAT./EMERGENCY" position wherein life threatening types of emergencies and the like are provided for visual notification on the second display section 150 and/or audible notification on the audio indicator 324, again depending on the position of switches 165, 166, 170 and 172. Of course, weather switch 168 may provide more than two positions as needed. For example, it may useful to provide notification of a weather event that could be destructive to property, such as providing notification of a freeze warning in areas where citrus is grown. Weather switch 168 represents one specific way for a user to set one or more weather notification parameters that are used to filter alerts so that only events of interest generate notification to a user.

Audible notification switch 170 is preferably a three-position slide switch that is connected to the processor 340 for programming the times at which audio signals are sent to the audio indicator 324. As shown, a slide 171 of the slide switch 170 is located at the "NO TIMES" position, signifying that an audible signal will not be generated, regardless of the settings of urgency switch 166, weather switch 168, and visual notification switch 172. The slide 171 may also be located at the "TIME RANGE" position wherein audible notification will occur only if the conditions set by area switches 165, urgency switch 166 and weather switch 168 have been met within a preset time range. The setting of a time range is discussed below. Slide 171 may also be located at the "ALL TIMES" position wherein audible notification will occur when the conditions set by the switches 165, 166 and 168 are met without regard to the time of day. In the preferred embodiment, the audio indicator 324 is a speaker. However, it is contemplated that sounds generated from bells, whistles, sirens, buzzers, piezo-electric indicators, and the like can be used in addition to, or in place of a speaker. Since many persons may be away from the weather radio during a weather alert, such as in a garage or shop or some other location, provision can be made on the weather warning apparatus 100 for activating remote sound generating means. Audible sounds may include, but are not limited to, single or plural tones, voice, and the like. In addition, different sounds may be associated with different degrees of urgency and the severity of the weather.

Visual notification switch 172 is preferably a three-position slide switch that is connected to the processor 340 for programming the times at which visual signals are sent to the visual indicator 326, such as the second display section 150 of FIG. 2. As shown, a slide 173 of the slide switch 172 is located at the "NO TIMES" position, signifying that a visual notification signal will not be generated, regardless of the settings of urgency switch 166 and weather switch 168. Slide 173 may also be located at the "TIME RANGE" position wherein visual notification will occur only if the conditions set by area switches 165, urgency switch 166 and weather switch 168 have been met at a time of day that is within the preset time range. Slide 173 may also be located at the "ALL TIMES" position wherein visual notification will occur when the conditions set by the switches 165, 166 and 168 are met without regard to the time of day. Although the preferred embodiment for a portion 150 of the visual indicator 326 is shown in FIG. 1 in the form of LED's 152, 154, 156 and 158, it is contemplated that visual indicating means may in the form of, but not limited to, incandescent lights, fluorescent lights, halogen lights, LCD display panels, fiber optics, electro-luminescent panels, moving mechanisms, and the like. A combination of any of the above indicating means may also be used. Again, since many persons may be away from the weather radio during a weather alert, provision can be made on the weather warning apparatus 100 for activating remote visual indicating means.

For both the audible notification switch 170 and the visual notification switch 172, the time range may be set by programming begin and end notification times in the processor 340. To set the begin notification time, the "BEGIN" button 178 is simultaneously depressed with one of the "HOURS" button 182 and "MINUTES" button 184 until the desired begin time is displayed in the display section 140. To set the end notification time, the "END" button 180 is simultaneously depressed with one of the "HOURS" button 182 and "MINUTES" button 184 until the desired end time is displayed in the display section 140. Once the buttons 178 and 180 are released, the begin and end times are set, and the display section 140 reverts back to the normal mode, wherein the time of day is displayed. In the preferred embodiment, the time range is the same for both audible and visual notification. However, provision may be made for setting different time ranges for audible and visual notifications.

A radio control section 190 includes a control switch 174 that is preferably a four-position slide switch for turning a radio portion of the warning apparatus 100 either on or off, for setting the radio portion to come on at a predetermined wake-up time, and for setting a wake-up alarm to sound at a predetermined wake-up time. A time button 186 is provided for setting the time of day, and a wake button 188 is provided for setting the wake-up time that the alarm or radio portion will be activated. To set the time of day, the time button 186 is simultaneously depressed with one of the hour and minute buttons 182, 184 until the correct time is displayed on the first display section 140. The alarm is set in a similar fashion. Control section 190 is similar to controls that are commonly used in digital alarm clocks and clock radios, they will not be described in greater detail.

Although the slide switches 166, 168, 170, 172 and 174 provide a quick and easy input means for a user to program the operation of apparatus 100, the invention is not to be limited thereto. It is contemplated that other input means for setting or preselecting weather urgency, weather type, and audible and visual notifications can be used, such as keypads, thumbwheel switches, rotary switches, toggle switches, DIP switches, potentiometers, variable capacitors, voice, and the like.

Figure 4:
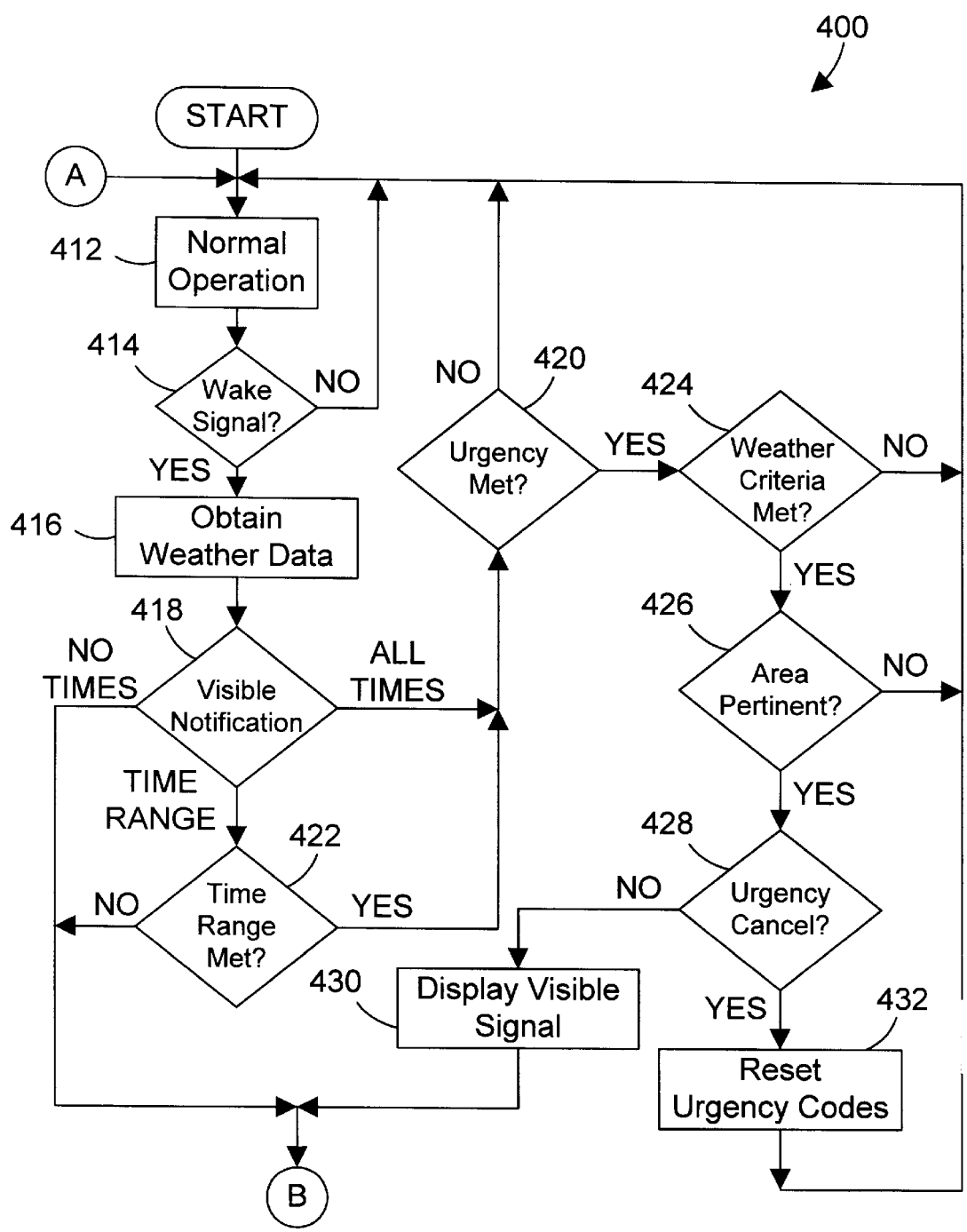
FIGS. 4 and 5 are each portions of a flow diagram of a method for indicating when user-defined weather warning parameters have been met.
Figure 5:
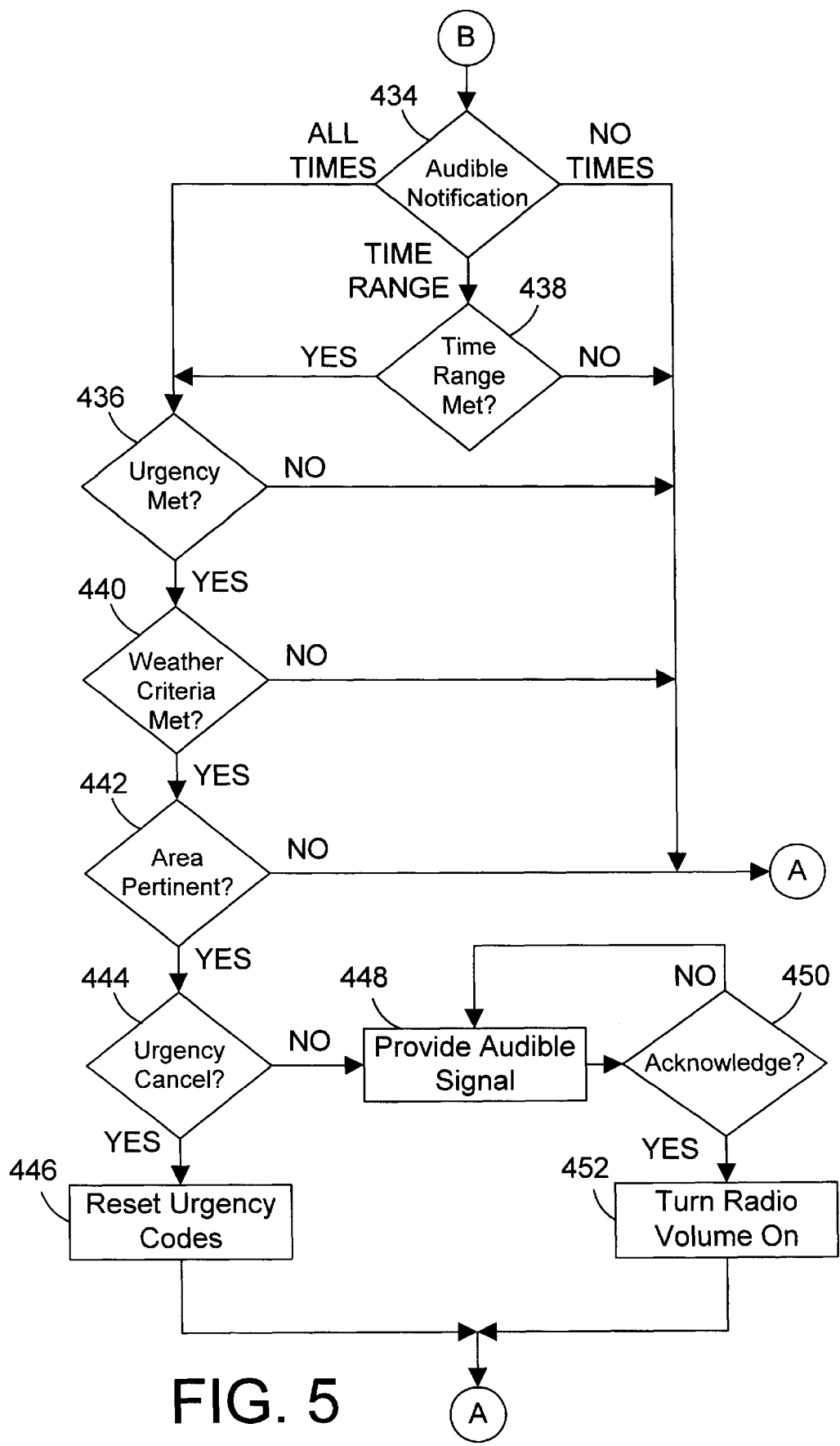

Referring now to FIGS. 4 and 5, a method 400 of receiving weather warning information and alerting when the information received meets preselected parameters as set by a weather warning apparatus 100 according to a first embodiment of the invention is illustrated. When the weather warning apparatus 100 is first turned on, the apparatus goes into a normal operation mode (step 412). The normal operation mode includes standard operating functions of the clock and radio portions and monitoring for a wake-up signal (step 414), in order to determine if a warning signal has been issued. Monitoring of the wake-up signal (step 414) preferably takes place even if the warning apparatus 100 is turned off, and this monitoring can be considered part of the normal operation in step 412.

In the preferred embodiment illustrated in FIG. 3, a weather data stream is transmitted from the data source 364 to the base station 360 to the processor 340 in the weather indicating apparatus 100 via the communication links 362 and 310. The weather data stream is preferably defined by a data record that has specific fields. The weather data stream is preferably preceded by the wake-up signal, and then followed by fields that represent: an urgency code, a weather type code, and an area code, although not necessarily in that order. The urgency code may include weather watches, warnings, statements, and the like. The urgency code may also include cancellation codes, such as cancel watch, cancel warning, and cancel statement. Likewise, the weather code may include winter storms, severe thunderstorms, blizzards, flooding, tornados/hurricanes, and other emergencies. The area code may include all areas within a particular geographic broadcast region, such as several counties, or a specific area, such as a particular county or subcounty. In addition, the weather data record may also include begin and end time fields that define the beginning and end times for the particular weather alerts in the weather data record. Furthermore, a signal type field in the weather data record may also be used to allow different types of audible and visible signals for the different types of weather alerts. Of course, apparatus 100 can also process the weather data record and provide different types of audible and visible signals based on the types of weather alert, time of day, etc. without requiring a separate signal type field in the weather data record.

If no wake-up signal is received (step 414=NO) (i.e., no severe weather warnings have been issued), the warning apparatus 100 continues in the normal operation mode (step 412). However, when the wake-up signal is received (step 414=YES), the weather data record is read by the processor (step 416) in order to interpret the urgency code, weather code, area code(s), and any applicable cancellation codes.

Next, method 400 determines if a visual notification has been set (step 418). If no visual notification has been set, i.e., the visual notification switch 172 (FIG. 1) is set to the "NO TIMES" position (step 418=NO TIMES), it is then determined at step 434 of FIG. 5 if an audio notification has been set. If the switch 172 has been set to the "ALL TIMES" position (step 418=ALL TIMES), it is then determined if the urgency parameters set by switch 166 have been met (step 420). If the switch 172 has been set to the "TIME RANGE" position (step 4188=TIME RANGE), it is determined at step 422 if the current time of day is within the user-defined time range. If not (step 422=NO), it is determined in step 434 of FIG. 5 whether an audio notification has been set. If the current time of day is within the user-defined time range (step 422=YES), it is determined if the urgency parameters set by switch 166 have been met (step 420).

In step 420, if the urgency condition has not been met (step 420=NO), such as when a weather watch has been issued and switch 166 is positioned at the "WARNING ONLY" position, the warning apparatus 100 continues in the normal operation mode (step 412). In this manner apparatus 100 filters out weather alerts that do not satisfy the urgency set by the user. If the urgency condition has been met (step 420=YES), it is then determined if the weather criteria set by switch 168 has been met (step 424), such as when a life threatening alert has been issued and switch 168 is set at the "LIFE THREAT./EMERGENCY" position. If the weather criteria for visual notification has been met (step 424=YES), then it is determined if the preselected area or areas for the urgency and weather types are within the areas selected by the user (step 426). If the area or areas for which the alert has been issued are different than the user-selected areas (step 426=NO), the warning apparatus 100 resumes its normal mode of operation (step 412), thereby filtering out weather alerts that are outside of the geographical area of interest set by the user. If, however, the area for the weather event corresponds to the area selected by the user (step 426=YES), method 400 proceeds to step 428.

At step 428, it is determined if the urgency alert has been canceled. This can occur as an interrupt after a predetermined effective time as set by the National Weather Service (NWS). The NWS currently uses sophisticated weather models in order to determine an alert's effective time and provides an effective time code with the weather data stream under the SAME alerting system. However, at the end of the predetermined alert time, severe weather may continue, especially if the storm is moving slower than expected. Thus, there may still be a weather emergency even after expiration of the predetermined alert time. This problem can be prevented by the provision of cancellation codes in the preferred embodiment of the invention. When the storm moves out of a preselected area, such as a county or subcounty, alert cancellation codes for that predetermined area may be generated and transmitted to the weather warning apparatus 100. The transmission and reception of cancellation codes is especially useful for indicating to persons when severe weather or other emergencies have moved out of the area. If a cancellation code has been received, or if the predetermined alert time has expired, the transmitted urgency codes are reset at step 432, and the weather warning apparatus 100 resumes its normal mode of operation (step 412). If the urgency has not been canceled (step 428=NO), a visual indicator is activated (step 430) on visual indicator 326, such as display 150 of FIG. 2.

Once the appropriate processing (explained above) for visual notification is complete, method 400 then determines in FIG. 5 whether or not to provide audible notification (step 434). If no audible notification has been set (step 434=NO TIMES) (i.e., the audible notification switch 170 (FIG. 1) is set to the "NO TIMES" position), the weather warning apparatus 100 resumes its normal mode of operation (step 412).

With additional reference to FIG. 5, if the audible switch 170 has been set to the "ALL TIMES" position (step 434=ALL TIMES), it is then determined if the urgency parameters set by switch 166 have been met (step 436). If the switch 170 has been set to the "TIME RANGE" position (step 434=TIME RANGE), it is determined at step 438 if the current time of day is within the user-defined time range. If not (step 438=NO), the weather warning apparatus 100 resumes the normal mode of operation (step 412). If the current time is within the user-defined time range (step 438=YES), it is determined if the urgency parameters set by switch 166 have been met (step 436), as explained above with reference to step 420.

If the urgency condition has not been met (step 436=NO), the warning apparatus 100 continues in the normal operation mode (step 412). If the urgency condition has been met (step 436=YES), it is then determined if the weather criteria set by switch 168 has been met (step 440).

At step 440, if the weather criteria has not been met (step 440=NO), the warning apparatus 100 continues in the normal mode of operation (step 412). If the weather criteria for audible notification has been met (step 440=YES), then it is determined if the preselected area or areas for the urgency and weather types are the same as the areas selected by the user (step 442). If the area or areas for which the alert has been issued are within the user-selected areas (step 442=YES), it is then determined if the urgency alert has been canceled (step 444). If the area or areas for which the alert has been issued are different than the user-selected areas (step 442=NO), the warning apparatus 100 resumes its normal mode of operation (step 412).

At step 444, it is determined if the urgency alert has been canceled. If a cancellation code has been received, or if the predetermined alert time has expired (step 444=YES), the transmitted urgency codes are reset at step 446, and the weather warning apparatus 100 resumes its normal mode of operation (step 412). If the urgency has not been canceled (step 444=NO), the audio indicator 324 is activated to provide an audible alert (step 448). The audible signal will continue (either constantly or at intervals) until the "ACKNOWLEDGE" button 176 is pressed (step 450=YES). Once pressed, the apparatus will automatically turn on a voice broadcast (step 452) from the National Weather Service. After a predetermined amount of time, the warning apparatus 100 will resume its normal mode of operation (step 412).

Although the above steps have been described in a particular order, it is to be understood that the invention is not limited thereto, since similar results occur if, for example, a cancellation signal is looked for before determining if the area, urgency, and weather parameters have been met. In addition, the geographical area(s) set by the user may be checked first before determining whether the alert satisfies urgency or weather notification parameters.

In the preferred embodiments disclosed herein, switches on control panel 130 allow a user to set both geographical and weather parameters for visual and audio notification of weather events and alerts. With the switches as shown in FIG. 1, the same geographic areas are applied to both visual and audio notifications, and the same weather parameters set by switches 166 and 168 apply to both visual and audio notifications. Thus, if the urgency for a visual notification is not met, there is no need to check to see if an audio notification should be provided because the urgency for the audio notification is the same as the urgency for the visual notification. However, it is equally within the scope of the present invention to provide separate notification areas and weather parameters for the audible and visual notifications. In this manner a user could receive different information on the visual indicator than is conveyed by the audio indicator.

Although the above-described embodiment has been characterized as a weather warning apparatus, it is to be understood that occurrence of other events may be of interest to persons. For example, the rise or fall in value of particular stocks or commodities may be important for persons that want to buy or sell at ideal times. Another event of interest to parents could be notification of when school is canceled, which is a relatively common occurrence in may parts of the country when bad weather makes driving conditions dangerous.

Figure 6:
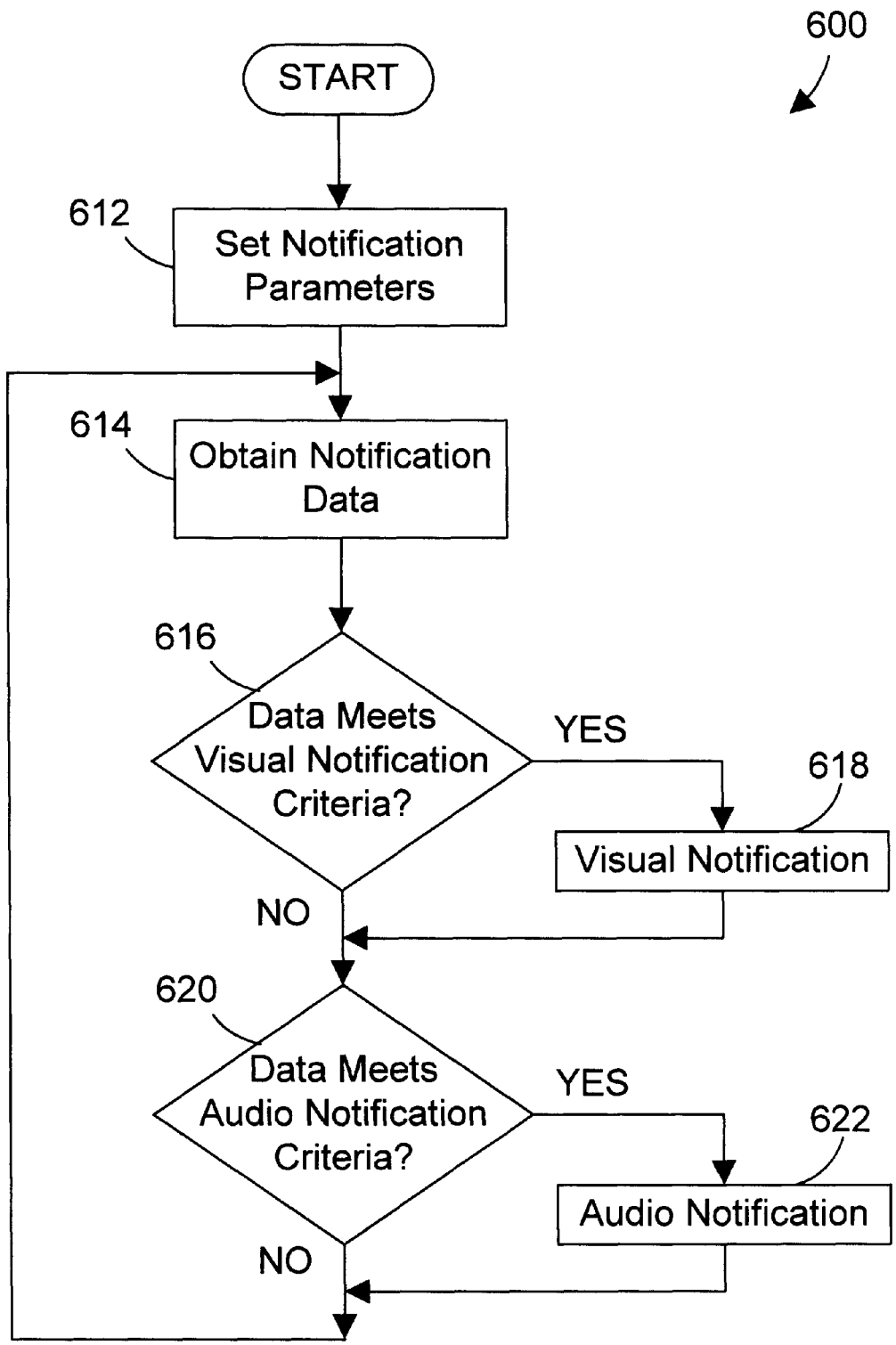
FIG. 6 is a flow diagram of a method according to a second embodiment of the invention for indicating when user-defined parameters have been met.

Referring now to FIG. 6, a method 600 of receiving and communicating the occurrence of preselected events according to a second embodiment of the invention is illustrated. At the beginning of the method, a user sets notification parameters (step 612:1. For example, a user may desire to receive notice that a particular stock has increased or decreased to a certain value for determining when to sell or buy the stock. This information can be programmed into the processor 340 in a number of different ways, including the use of rotary switches 165 (FIG. 1), keypads, and the like. The information may be entered in the form of numeric codes, alpha-numeric codes, and the like.

In step 614, a notification data stream is received from a data source, that may be similar in operation to the data source 364 previously described. Alternatively, the data stream may be broadcast from a radio station or the like during regular voice broadcasts on any of the available broadcast bands, with embedded code that cannot be audibly discerned by listeners. Preferably, an information data stream is transmitted from the data source 364 to the base station 360 to the processor 340 via the communication links 362 and 310. The data stream can be preceded by a wake-up signal, then followed by many different codes for different items or events of interest. The processor filters out all events that were not previously programmed by the user by determining if the events are to be visually displayed (step 616) and/or audibly displayed (step 620). If one or more events meet the visual display criteria, then visual notification is given (step 618). After visual notification, or if the events do not meet the visual display criteria, it is then determined if the data meets the audio notification criteria (step 620). If one or more events meet the audio notification criteria, then audio notification is given (step 622). After audio notification, or if the transmitted events do not meet the visual or audio display criteria, notification data is again received from the data source (step 614) and the visual and audio filters are again applied (steps 616 and 620).

The present invention thus provides an apparatus and method for notifying a user of weather-related alerts according to preset weather alert areas and weather notification parameters. While the specific embodiments disclosed herein describe the best mode of the invention, other enhancements are also within the scope of the present invention. For example, if a more sophisticated user interface were provided, a user could program apparatus 100 with more complex filtering criteria. For example, a user might program the apparatus 100 to provide notification of all watches and warnings in the user's home county, while providing notification of only warnings in neighboring counties. This and other examples of more complex filtering are expressly within the scope of the present invention.

While the invention has been taught with specific reference to the above-described embodiments, those skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. An apparatus for notifying a person when at least one preselected weather event occurs, the apparatus comprising:
    a processor;
    a user input mechanism coupled to the processor, the user input mechanism including:
        (A) a geographical selector mechanism coupled to the processor for selecting at least one weather alert area from a plurality of weather alert areas;
        (B) a notification selector mechanism coupled to the processor for selecting at least one weather notification parameter from a plurality of weather notification parameters indicative of weather events;
    a communication link coupled to the processor, the communication link receiving transmitted weather data corresponding to at least one transmitted weather alert area and at least one transmitted weather notification parameter and transferring the weather data to the processor;
    a notification mechanism coupled to the processor, the notification mechanism being activated when:
        the at least one selected weather alert area corresponds to the transmitted weather alert area; and
        the at least one selected weather notification parameter corresponds to the transmitted weather notification parameter;
    wherein activation of the notification mechanism alerts a person when the at least one selected weather event occurs within the at least one selected weather alert area; and
    a notification input selector coupled to the processor for selecting a time parameter for activating the notification mechanism when the at least one selected weather alert area corresponds to the transmitted weather alert area and the at least one selected weather notification parameter corresponds to the transmitted weather notification parameter during the selected time parameter.

2. The apparatus of claim 1 wherein the notification mechanism comprises an audible indicator.

3. The apparatus of claim 2 wherein the audible indicator comprises a speaker.

4. The apparatus of claim 2 wherein the notification input selector comprises an audible notification input selector for selecting the time parameter for activating the audible indicator.

5. The apparatus of claim 4 wherein the time parameter is selected from a group of time parameters comprising: 1) no times, wherein the audible indicator is not activated; 2) all times, wherein the audible indicator is always activated when the at least one selected weather alert area corresponds to the transmitted weather alert area and the at least one selected weather notification parameter corresponds to the transmitted weather notification parameter; and 3) a time range, wherein the audible indicator is activated only when the at least one selected weather alert area corresponds to the transmitted weather alert area and the at least one selected weather notification parameter corresponds to the transmitted weather notification parameter during a time of day that is within a preselected time period.

6. The apparatus of claim 1 wherein the notification mechanism comprises a visual indicator.

7. The apparatus of claim 6 wherein the visual indicator comprises a display.

8. The apparatus of claim 6 wherein the notification input selector comprises a visual notification input selector for selecting the time parameter for activating the visual indicator.

9. The apparatus of claim 8 wherein the time parameter is selected from a group of time parameters comprising: 1) no times, wherein the visual indicator is not activated; 2) all times, wherein the visual indicator is always activated when the at least one selected weather alert area corresponds to the transmitted weather alert area and the at least one selected weather notification parameter corresponds to the transmitted weather notification parameter; and 3) a time range, wherein the visual indicator is activated only when the at least one selected weather alert area corresponds to the transmitted weather alert area and the at least one selected weather notification parameter corresponds to the transmitted weather notification parameter during a time of day that is within a preselected time period.

10. An apparatus for notifying a person when at least one preselected weather event occurs, the apparatus comprising:
    a processor;
    a user input mechanism coupled to the processor, the user input mechanism including:

(A) a geographical selector mechanism coupled to the processor for selecting at least one weather alert area from a plurality of weather alert areas;

(B) a notification selector mechanism coupled to the processor for selecting at least one weather notification parameter from a plurality of weather notification parameters indicative of weather events;

a communication link coupled to the processor, the communication link receiving transmitted weather data corresponding to at least one transmitted weather alert area and at least one transmitted weather notification parameter and transferring the weather data to the processor;

an audible notification input selector coupled to the processor for selecting a first time parameter for activating an audible indicator;

a visual notification input selector coupled to the processor for selecting a second time parameter for activating a visual indicator;

the audible indicator being activated to produce an audible notification when:
 the at least one selected weather alert area corresponds to the transmitted weather alert area; and
 the at least one selected weather notification parameter corresponds to the transmitted weather notification parameter within the first selected time parameter;

the visual indicator being activated to produce a visual notification when:
 the at least one selected weather alert area corresponds to the transmitted weather alert area; and
 the at least one selected weather notification parameter corresponds to the transmitted weather notification parameter within the second selected time parameter;

wherein activation of the notification mechanism alerts a person when the at least one selected weather event occurs within the at least one selected weather alert area.

11. A method for notifying a person when at least one preselected weather event occurs, comprising the steps of:
 selecting at least one weather alert area from a plurality of weather alert areas;
 selecting at least one weather notification parameter from a plurality of weather notification parameters indicative of weather events;
 receiving transmitted weather data corresponding to at least one transmitted weather alert area and at least one transmitted weather notification parameter;
 notifying a user when the at least one selected weather alert area corresponds to the transmitted weather alert area and when the at least one selected weather notification parameter corresponds to the transmitted weather notification parameter; and
 selecting a time parameter for notifying the user when the at least one selected weather alert area corresponds to the transmitted weather alert area and the at least one selected weather notification parameter corresponds to the transmitted weather notification parameter during the first selected time parameter.

12. The method of claim 11 wherein the step of notifying comprises activating an audible indicator.

13. The method of claim 11 wherein the step of notifying comprises sending an audible weather radio broadcast to a speaker.

14. The method of claim 11 wherein the step of notifying comprises activating a visual indicator.

15. The method of claim 11 wherein the step of notifying comprises displaying a visual notification on a display.

16. The method of claim 11 wherein the time parameter is selected from a group of time parameters comprising: 1) no times, wherein the user is not notified; 2) all times, wherein the user is always notified when the at least one selected weather alert area corresponds to the transmitted weather alert area and the at least one selected weather notification parameter corresponds to the transmitted weather notification parameter; and 3) a time range, wherein the user is notified only when the at least one selected weather alert area corresponds to the transmitted weather alert area and the at least one selected weather notification parameter corresponds to the transmitted weather notification parameter during a time of day that is within a preselected time period.

17. The apparatus of claim 1 wherein the notification mechanism comprises an audible indicator and a visual indicator.

18. The apparatus of claim 17 wherein the notification input selector comprises:
 an audible notification input selector for selecting a first time parameter for activating the audible indicator; and
 a visible notification input selector for selecting a second time parameter for activating the visual indicator.

19. The apparatus of claim 11 wherein the step of notifying the user comprises performing at least one of the following steps:
 activating an audible indicator; and
 activating a visual indicator.

20. The apparatus of claim 19 wherein the step of selecting the time parameter for notifying the user comprises the steps of:
 selecting a first time parameter for activating the audible indicator; and
 selecting a second time parameter for activating the visual indicator.

\* \* \* \* \*